United States Patent [19]

Claudon

[11] Patent Number: 5,352,152
[45] Date of Patent: Oct. 4, 1994

[54] METHOD AND APPARATUS FOR PROCESSING FISH

[76] Inventor: Brian J. Claudon, 4855 Lakehurst La., Bellevue, Wash. 98006

[21] Appl. No.: 79,622

[22] Filed: Jun. 18, 1993

[51] Int. Cl.⁵ .............................................. A22C 25/14
[52] U.S. Cl. .................................. 452/127; 452/121
[58] Field of Search ........................ 452/110, 118, 121

[56] References Cited

U.S. PATENT DOCUMENTS

| | | | |
|---|---|---|---|
| 3,925,846 | 12/1975 | Leander | 452/110 |
| 4,563,793 | 1/1986 | Ryan | 17/58 |
| 4,630,335 | 12/1986 | Claudon | 452/110 |

FOREIGN PATENT DOCUMENTS

| | | |
|---|---|---|
| 46-2862 | 5/1971 | Japan . |
| 50-28360 | of 1975 | Japan . |
| 50-39039 | of 1975 | Japan . |

OTHER PUBLICATIONS

Flyer, Toa Koekl, Co. Ltd. undated.
Photo of Nikko Machine in Japan dated Oct. 21, 1992.
Blue Print, Coastline Equip. Inc. (Supper Gutter) dated Feb. 28, 1988.

*Primary Examiner*—Willis Little
*Attorney, Agent, or Firm*—Don R. Mollick

[57] ABSTRACT

A method and apparatus for processing fish with minimal damage to eggs and entrails is shown, the machine includes adjustable arms that conform to the inner belly wall of a fish passing through the machine which detach eggs and entrails from the belly wall of the fish, further adjustable entrail removal arms remove the eggs and entrails from the fish through a slit made by a blade.

27 Claims, 4 Drawing Sheets

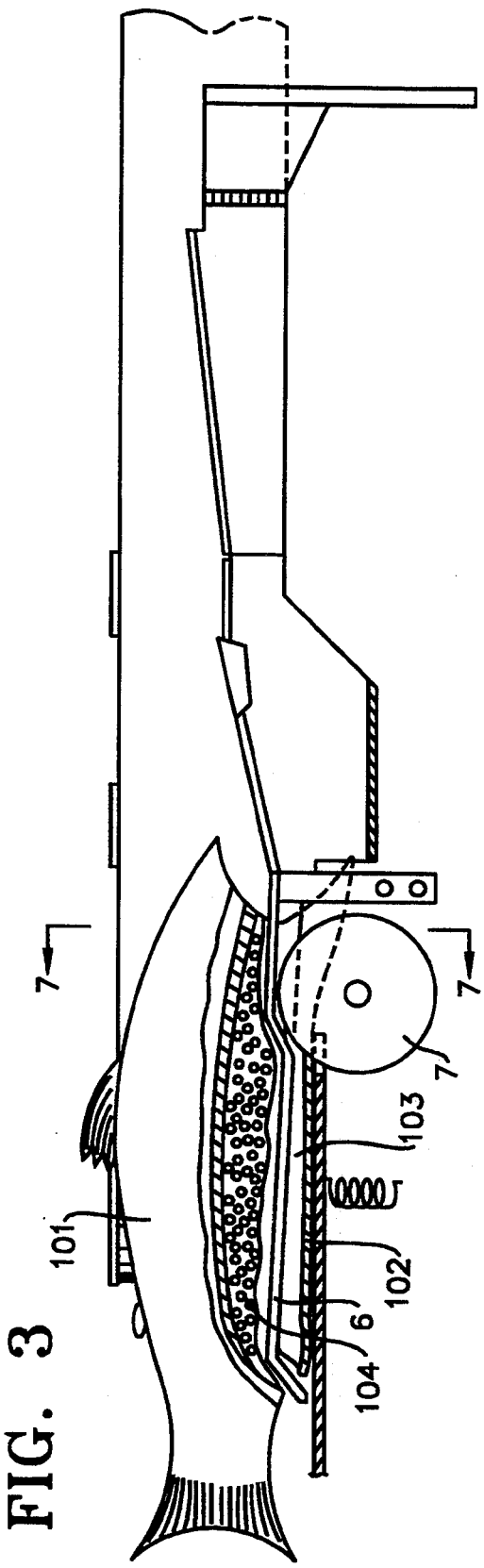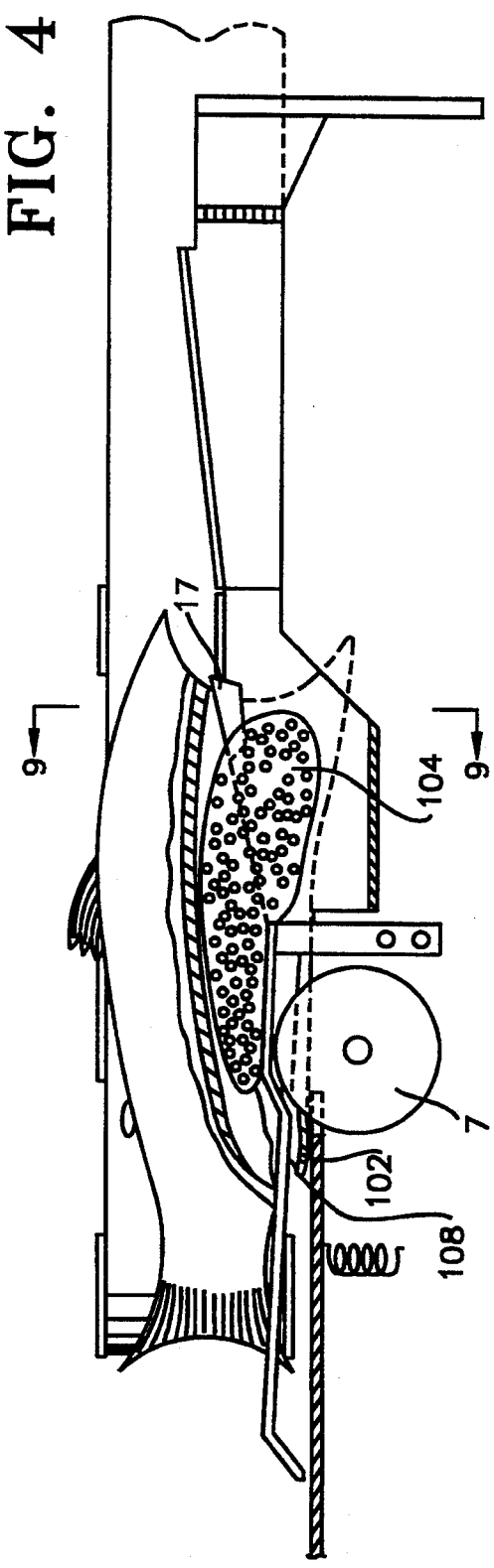

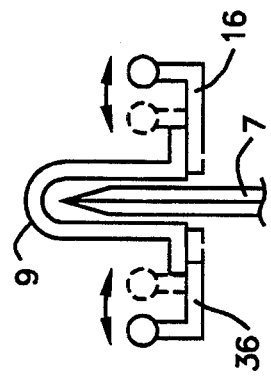
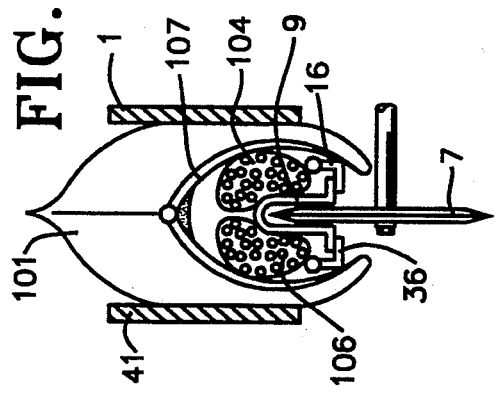
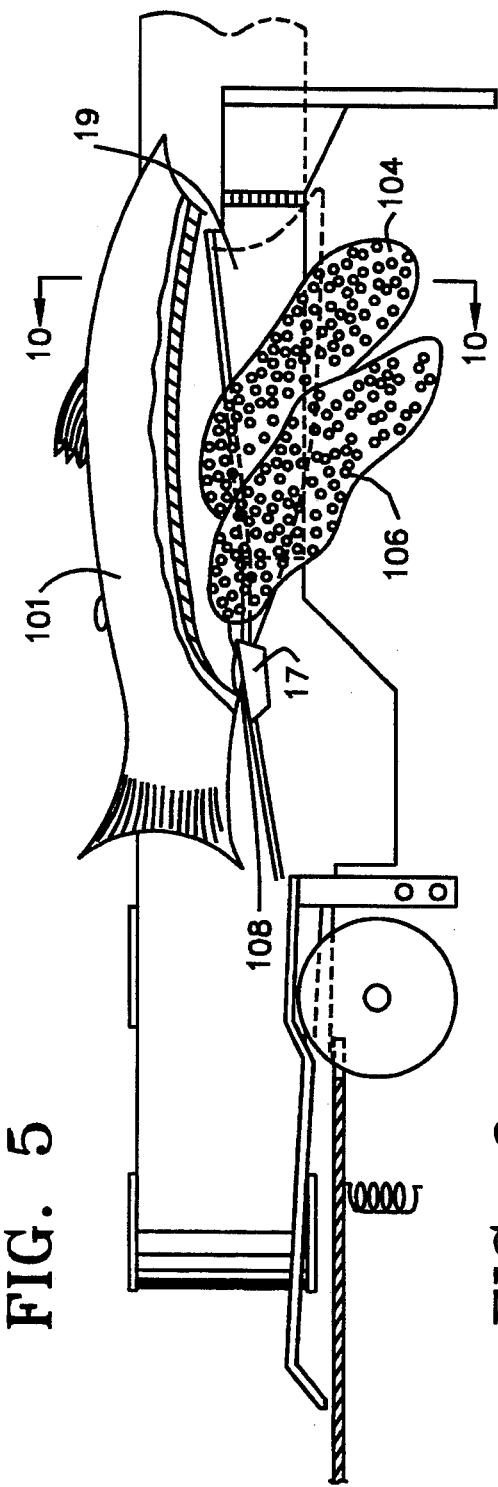
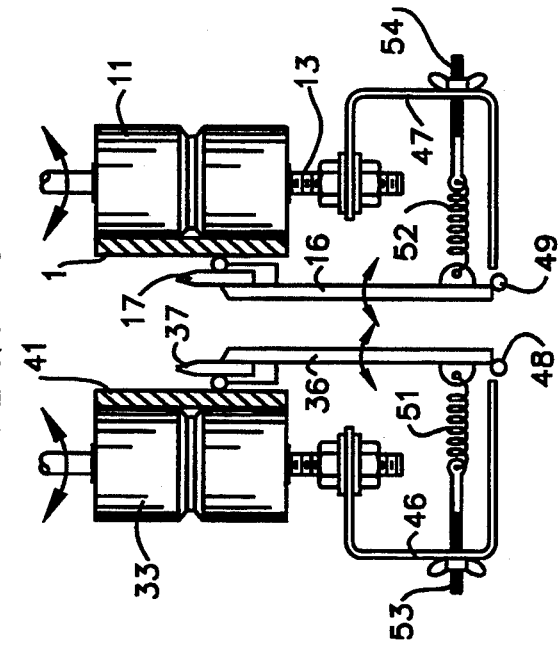

METHOD AND APPARATUS FOR PROCESSING FISH

FIELD OF INVENTION

The invention pertains to machines for processing fish. More particularly it relates to machines for slicing the bellies of fish and removing the viscera and roe of the fish while avoiding damage to meat of the fish or roe.

PRIOR ART

Fish gutting machines have been in use for many years. The early machines were not intended to preserve the internal organs of the fish or roe. These parts of the fish were either discarded or used for low value products such as fertilizer or pet food.

Beginning in the 1960's a market for fish roe, including salmon roe developed, first in the far east then in North America. Accordingly, a demand developed for machines that remove and preserve the fish roe with minimal damage. Fish roe is most valuable when the roe is in the original membranes or skeins. The removal process must be quite gentle in order to avoid rupturing skeins. This is because the skeins are much more fragile than the roe.

Fish processing machines of the desired type must have several desirable attributes in order to be economically viable. First, the feed device which accepts fish and feeds them through the machine must do so without damage. Feed devices include one or more belts. It is imperative that the feed means does not damage the meat of the fish or pierce the body cavity. The feed device should accept either head-on or beheaded fish.

Slitting means should be provided to slit the underside of the fish. This process is quite exacting as it is generally undesirable to make too deep a cut. The cut must be of sufficient length to allow easy removal of viscera without damage to the meat. Means of cutting the belly include a wide variety of knives and saws both conventional and rotary.

Next viscera are separated from the fish belly walls. Preferably this is done automatically for a variety of fish sizes. In conventional machines this is done with a variety of scoops, brushes and/or gutting wheels. Each of these methods can cause unacceptable damage to the roe.

In the case of head on and head off fish, it is desirable to release the fish esophagus (gullet) from the collarbones and from the kidney nearest the head end of the fish. This operation must also be done without damaging the roe or meat.

Finally, the device should eject the viscera through the cut created by the slitter. This ejection of the organs must be sufficiently gentle so as not to damage the skeins or meat of the fish.

Against the above parameters we will now compare several existing machines. In the fist type described the belly of the fish is first slit. Belts then carry the fish over a gutting wheel. The gutting wheel is a multiple armed wheel with a detached center plate. The gutting wheel simultaneously detaches the viscera from the fish and scoops them out the belly slit. This action is sufficiently violent so as to greatly diminish the economic value of the roe which ends up scrambled with the viscera.

An alternative solution is made by the RYAN machine as illustrated in U.S. Pat. No. 4,563,793. In this machine the heads are removed and the gullet cut made outside the machine. The headless fish are then conveyed by belts over a belly cutting blade which makes the first incision. The fish are then conveyed over a stationary entrails scoop, which is intended to remove the entrails from the fish and take them out of the slit. A gutting wheel is further provided to remove any entrails not removed by the scoop. While this machine has met with wide use the amount of damage to the roe is still unacceptable to discriminating customers.

An attempt to remedy the problems with the above devices led to the development in 1992 of the "NIKKO" machine. In this device headless collar on fish are supplied to a pair of vertical belts. The belts propel the fish over a circular belly blade which slits the belly of the fish. The fish then proceed over a stationary center gut scoop. On the top of this scoop is a horizontal curved top gullet blade. This blade is intended to detach the viscera from the fish and is curved to fit the top curve of the gullet. A major flaw of this design is that the blade while effective is non adjustable. As a result the machine is effective for only a single size of fish. If the fish is too small the fish is severely damaged, on the other hand, if the fish is too large the viscera are not completely removed. These problems have prevented widespread adoption of this design.

In summary there is a long-standing need for a fish processing machine which allows removal of viscera and roe without damaging either the fish or the roe. The device should perform as many of the operations as possible and be self adjusting for a variety of fish sizes and species.

SUMMARY OF THE INVENTION

The invention provides a method and apparatus for cleaning fish and removing roe intact. The invention works equally well with head-on and head-off fish. The invention releases the gullet from the collarbone and from the kidney nearest the head end of the fish. The invention further provides a means to produce straight belly cuts without damaging the skeins or roe. The invention separates the viscera from the fish belly walls automatically for a variety of fish sizes. Finally, the invention gently ejects the viscera and roe from the fish through the belly cut.

The apparatus of the invention includes a plurality of feed belts for feeding fish through the apparatus. Fish are inserted between a pair of the feed belts. The invention provides a guide rod which is run through the uncut gullet then through the digestive track exiting at the anus. This method protects the roe from the feed rod. The belts then propel the fish past a belly cutting blade which makes an incision of exactly the proper length for proper removal of viscera. Next the fish are propelled by the belts to the gutting area of the apparatus. Here a movable gullet release arm separates the viscera from the belly walls. The gullet release arm may be provided with a pair of vertical blades to facilitate the removal. The blades are not desirable if used with soft bodied fish or if the gullet is detached prior to cleaning. The blades cut upward along each side of the gullet. The gullet release arm is provided with a sloping surface to cut up the inside of the belly cavity and to incline the fish. The apparatus is further provided with a pair of gut stripping arms. The gut stripping arms are hinged to move in and out with the gullet release arms. The top edge of the gut stripping arm is turned in toward the center of the fish belly. This allows the arm

BRIEF DESCRIPTION OF THE DRAWINGS

FIG. 3 is a view of a fish entering the slitting station of the FIG. 1 apparatus.

FIG. 4 is a view of a fish entering the gutting station of the FIG. 1 apparatus.

FIG. 5 is a view of a fish exiting the FIG. 1 apparatus.

FIG. 6 is a side section view of the FIG. 1 apparatus.

FIG. 7 is a side section view of FIG. 3 showing the slitting operation.

FIG. 8 is a side section view of FIG. 1 showing operation of the gutting station arms.

DETAILED DESCRIPTION OF THE APPARATUS

Figure 1:
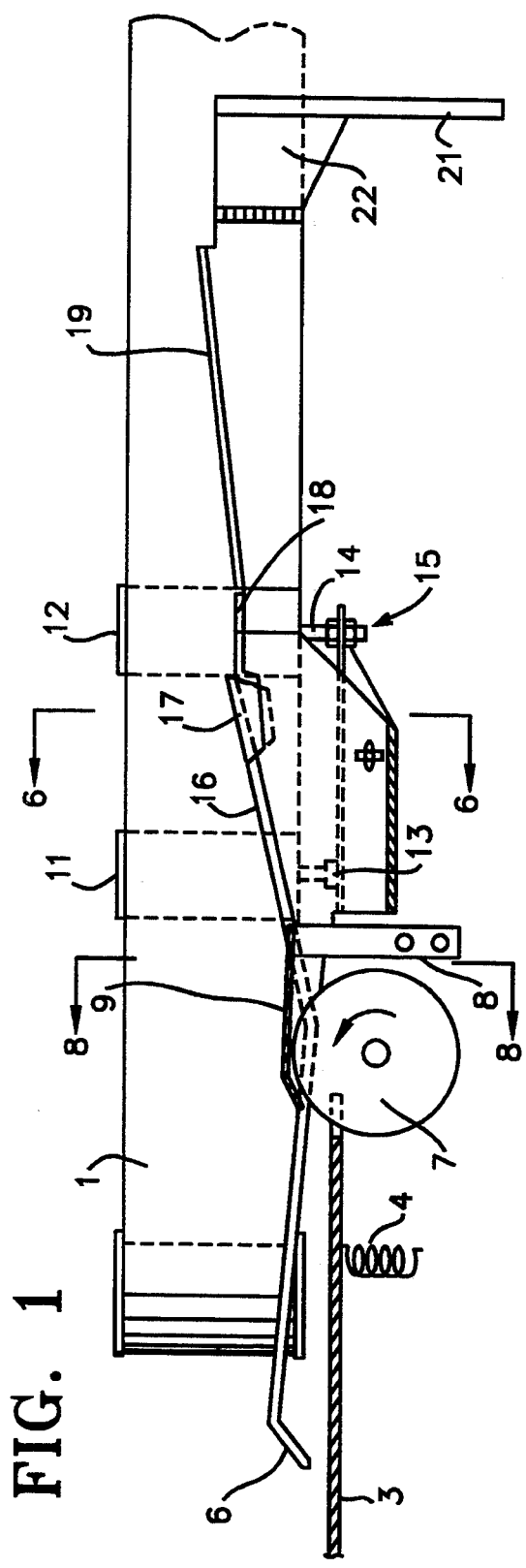
FIG. 1 is a front elevation section view of the apparatus of the invention.

FIG. 1 is a side elevation view of the apparatus of the invention. All components are understood to be connected to a framework as described below. In this description identical numbers are used for identical parts even though the parts may be shown in different views.

The apparatus includes at least one feed belt 1. Belt 1 is carried on at least one pulley 2 attached to the framework. Additional support may be provided by feed pulleys 11 and 12. An adjustable tray 3 is attached to the framework by a spring 4. The apparatus further includes an elongated rod member 6 with one end free and the other end attached to the slitting station. The slitting station includes a knife 7 or belly blade which in this embodiment is a powered rotating knife. Knife 7 is further provided with a shield 9 attached to the framework by mounting 8.

A gutting station 15 forms an important portion of the apparatus. Two gullet release arms are contemplated in this embodiment one being shown in FIG. 1. Gutting station 15 includes an inclined surface 16 on the gullet release arm. The forward end 16 of the gullet release arm is slidable along the bottom of shield 9. Near the top portion of inclined surface 16 is positioned a gullet blade 17. Immediately adjacent to blade 17 is a flat surface 18. Feed pulleys 11 and 12 are slidably attached via their axles 13 and 14 to the gullet release arm 16,17. A gut stripping arm 19 having an inclined surface is hingebly attached to gullet release arm 16,17. The end of gut stripping arm 19 not attached to gullet release arm 16,17 is attached to a mounting 22 which is rotativebly attached to the framework by a hinge 21.

Figure 11:
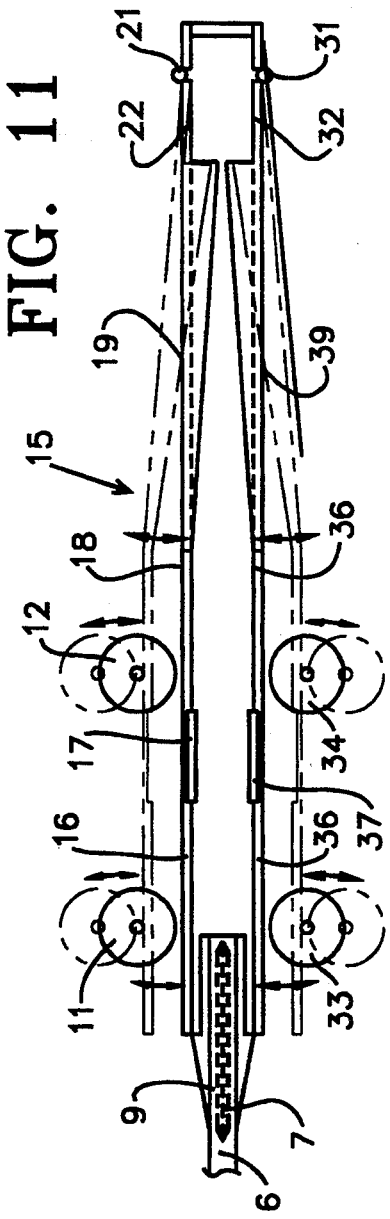
FIG. 11 is a top plan view of the FIG. 1 apparatus.

FIG. 11 is a top plan view of the FIG. 1 apparatus which clearly shows the major components of gutting station 15. Shield 9 covers knife 7. And rod 6 is seen to act effectively as an extension of shield 9. In the starting position the gullet release arm 16,17,18 is collinear with the gut stripping arm 19. A second gullet release arm 36,37, 38 is parallel to arm 16,17,18 and is so confined to remain so. Upon entry of a fish, feed pulleys 11 and 12 and their mates 33 and 34 are pushed into the dotted position by pressure on the belts (deleted for clarity). This movement in turn pushes the gullet release arms 16 , 17,18 and 36,37,38 into the dotted position. This movement is accommodated by movement of the gut stripping arms 19 and 39 on their respective pivots 21 and 31 through mountings 22 and 32.

FIG. 6 a section elevation view of FIG. 1 clarifies the mounting of the above components. Belt 1 is shown with its mate belt 41. Belts 1 and 41 are pressed against their respective feed pulleys 11 and 33 by the be lt tension. Pulleys 11 and 33 are rotatebly mounted to their axles 13 and 43 which are in turn attached to mounting arms 46 and 47. The gullet release arms 16 and 36 are attached to mounting arms 46 and 47 by means of hinges 48 and 49.. Hinges 48 and 49 allow arms 16 and 36 to pivot relative to pulleys 11 and 31. Arms 16 and 36 are biased against belts 1 and 41 by two springs 51 and 52. The ends of springs 51 and 52 not attached to arms 16 and 36 are attached to adjustable mountings 53 and 54 respectively. Blades 17 and 37 are attached to arms 16 and 36 respectively.

FIG. 8 is a side section view of the front portion of the gutting station in FIG. 1. Knife 7 is shown covered by shield 9 in this view. Arms 16 and 36 are movable between the out position shown and the in position dotted. The remaining figures detail the operation of the apparatus.

Figure 2:
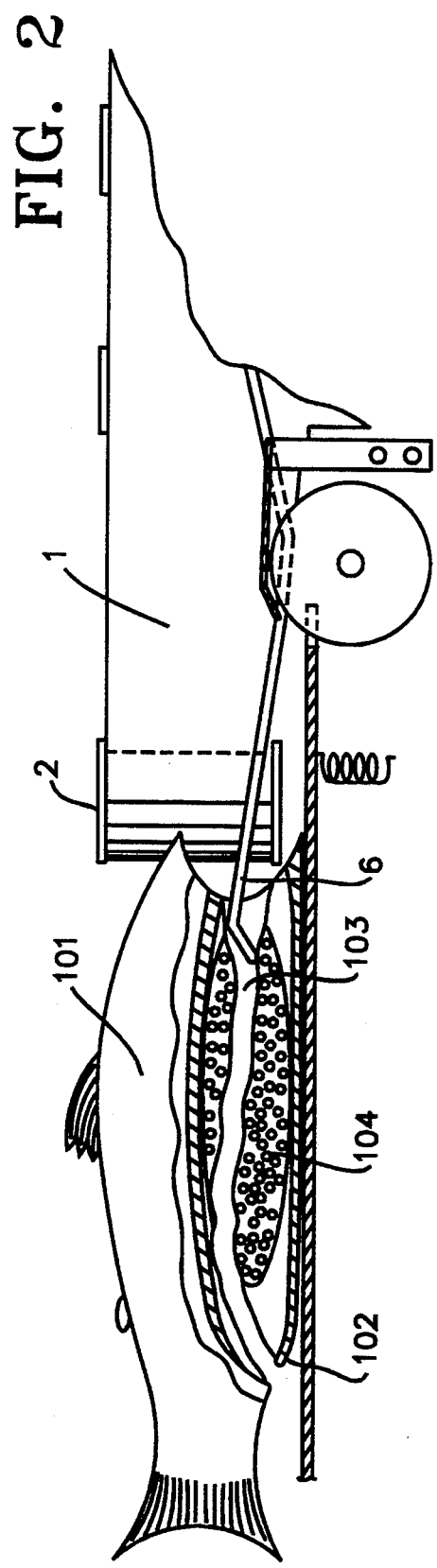
FIG. 2 is a view of a fish entering the FIG. 1 apparatus.

FIG. 2 is a view of a fish 101 entering the FIG. 1 apparatus. While fish 101 is shown in head off configuration it should be recognized that the invention is equally effective with head on fish. Parts of fish 101 important to understanding of the invention include the belly wall 102 intestinal channel 103 and egg skein 104.

It will be noted that upon insertion into the apparatus member 6 is inserted into the intestinal cavity 103 of fish 101. In the case of head-on fish the collar is cut loose from the viscera. Then the head is tipped so member 6 can continue down channel 103. Fish 101 rests on tray 3. Tray 3 automatically adjusts to the proper heights by the balance between fish 101's weight and spring 4. In FIG. 2 fish 101 is just about to contact belt 1 in the vicinity of pulley 2. When this contact occurs fish 101 will be pulled into the FIG. 3 position.

FIG. 3 is a front section view of fish 101 entering the slitting station of the FIG. 1 apparatus. In this view it is apparent that knife 7 is in the process of slitting belly wall 102. It should be noted that knife can slice no deeper than member 6 which is contained in cavity 103 of fish 101 this is due to the connection of shield 9 to member 6. At no point does knife 7 pierce skein 104.

FIG. 7 is a side section view of fish 101 entering the slitting station of the FIG. 3 apparatus taken just downstream of knife 7 looking toward the entry to the apparatus. The additional skein 106 and the belly cavity are visible in this figure. Fish 101 is propelled down the apparatus by belts 1 and 41. It is apparent that knife 7's slitting is limited by shield 9 to the area desired. Due to the rounded top of shield 7 and the location of skeins 104 and 106 on either side of fish 101 skeins 104 and 106 are not pierced by knife 7. In this figure the leading edges of gullet release arms 16 and 36 have entered belly cavity 107. Belts 1 and 41 now propel fish 101 into the FIG. 4 position.

FIG. 4 is a side elevation view of fish 101 moving into the gutting station of the apparatus. In this view knife 7 has nearly finished slicing open belly wall 102 of fish 101. Member 6 exits through fish 101's anus 108. At anus 108 the slit will end as is traditional in fish cleaning. it will be noted that skein 104 is loosened but still confined within fish 101.

Figure 9:
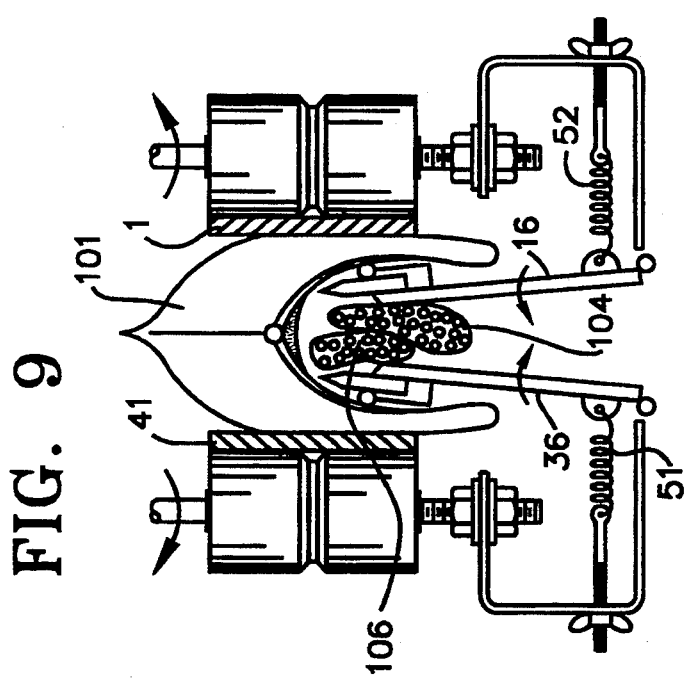
FIG. 9 is a side section view of FIG. 4 showing operation of the gutting arms of the invention.

FIG. 9 is a side section view of FIG. 4 taken midway along blade 17 looking toward the entry to the apparatus. Belts 1 and 41 are propelling fish 101 toward the viewer. Blades 17 and 37 closely follow interior belly wall 107 of fish 101 effectively detaching any entrails as well as skeins 104 and 106 that may adhere to belly wall 107. In the case of soft bodied fish blades 17 and 37 are not necessary as the pressure of gullet release arms 16 and 36 is sufficient. Arms 16 and 36 closely conform to the interior of fish 101 because of the outward force exerted by springs 51 and 52. It should be noted that blades 17 and 37 do not cut into either skeins 104 and 106 or the entrails, but rather detach them from the belly wall. In this manner damage to skeins 104 and 106 is avoided. Belts 1 and 41 now propel fish 101 into the FIG. 5 position.

FIG. 5 is a front section view of the FIG. 1 apparatus with fish 101 completing the gutting process. Skeins 104 and 106 are nearly completely removed from fish 101 and are being gently pulled by gravity through the slit in the belly of fish 101. The slitting process is complete. Blade 17 is exiting fish 101 in the vicinity of anus 108. The apparatus is now ready to accept another fish and the process can be repeated in the order just described.

Figure 10:
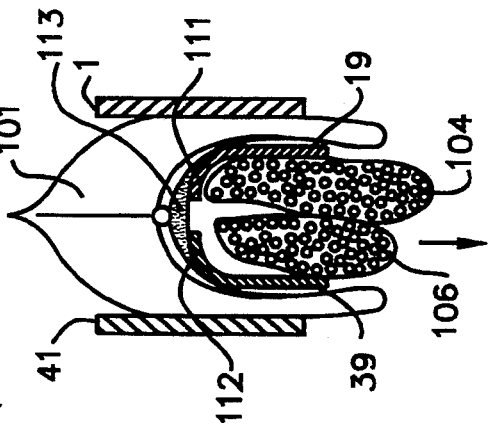
FIG. 10 is a side section view of FIG. 5 showing removal of skeins.

FIG. 10 is a side section view of FIG. 5 taken near the end of gullet removal arm 19 looking toward the entrance to the apparatus. Belts 1 and 41 are propelling fish 101 toward the viewer. The curved top sections 111 and 112 of arms 19 and 39 respectively closely conform to the internal cavity of fish 101 and aid gravity in removal of skeins 104 and 106. The cleaning process is now complete and fish 101 is propelled out of the apparatus by belts 1 and 41. If desired a rotating brush or wheel (not shown can be used to remove any traces of the viscera 113 from fish 101. Skeins 104 and 106 fall a short distance into a container (not shown) positioned below them.

I claim:

1. A fish processing machine for removing viscera and egg skeins from fish with minimal damage comprising: a framework for attachment and support of components thereto; and, two feed belts attached to said framework for moving fish through the machine wherein the distance between said belts is automatically adjustable to allow said belts to accept different sized fish, and a gullet release arm attached to each belt adapted to move along the belly wall of a fish moved through the machine by said feed belts, and a entrail removal arm pivotally attached to each gullet release arm at one end and pivotally attached to said framework at the other end for remove entrails from the body of a fish moved through the machine by said belts.

2. A machine as in claim 1 wherein a blade is attached to each gullet release arm to further facilitate detachment of entrails for belly walls.

3. A machine as in claim 1, further comprising belly slitting means for slitting bellies of fish moved through the machine by said belts.

4. A machine as in claim 3, wherein said belly slitting means includes a circular rotatable knife and a shield.

5. A machine as in claim 4, further comprising fish positioning means for positioning fish in the proper orientation for cleaning.

6. A machine as in claim 5, wherein said fish positioning means includes an elongated rod with one end attached to said shield.

7. A machine as in claim 1 wherein said gullet release arms are attached to said belt through at least one feed pulley.

8. A machine for processing fish comprising: a framework for supporting the machine; and, feed means attached to said frame for accepting and feeding fish through the machine; positioning means attached to said framework for positioning fish in said machine; and, slitting means attached to said framework for slitting the belly of fish in said machine; gullet detachment means movably attached to said framework for detaching fish entrails from the belly wall; and, entrail removal means attached to said framework for removing entrails from fish.

9. A machine as in claim 8 wherein said positioning means is adapted to accept head on and head off fish.

10. A machine as in claim 8, wherein said slitting means includes a rotatable circular knife.

11. A machine as in claim 8, wherein said feed means includes two vertical feed belts.

12. A machine as in claim 8, wherein said positioning means includes an elongated rod and a movable tray.

13. A machine as in claim 8, wherein said gullet detachment means includes an arm adapted to slide upwards from the bottom of the belly cavity to the top of the belly cavity along the belly wall of a fish as the fish is moved through the machine by said feed means.

14. A machine as in claim 13 wherein said arm is further provided with a blade for aiding in detaching entrails from a fish.

15. A machine as in claim 13, wherein there are at least two movable arms adapted to slide along opposite belly walls of a fish moved through the machine by said feed means.

16. A machine as in claim 15, wherein the distance between said arms is adjusted automatically to compensate for different sized fish.

17. A machine as in claim 8, wherein said entrail removal means, includes an arm adapted to slide along the inner belly wall of a fish in an upward direction from the slit in the belly towards the top of the belly cavity as the fish is moved through the machine by said feed means.

18. A machine as in claim 17, wherein there are at least two movable arms adapted to slide along opposite belly walls of a fish moved through the machine by said feed means for removing entrails from the fish.

19. A machine as in claim 18, wherein the distance between said arms is adjusted automatically to compensate for different sized fish.

20. A machine as in claim 17, wherein said gullet detachment means includes an arm adapted to slide along the belly wall of a fish as the fish is moved through the machine by said feed means.

21. A machine as in claim 19, wherein said gullet detachment arm is further provided with a blade for aiding in detaching entrails from a fish.

22. A machine as in claim 19, wherein there are at least two movable gullet detachment arms adapted to slide along opposite belly walls of a fish moved through the machine by said feed means.

23. A machine as in claim 22, wherein the distance between said gullet detachment arms is adjusted automatically to compensate for different sized fish.

24. A machine as in claim 21, wherein said gullet detachment arm is movably attached to said entrail removal arm.

25. A machine as in claim 24, wherein there are two gullet detachment arms movably attached to two entrail removal arms.

26. A machine as in claim 25, wherein said movable attachment is a pivot.

27. A machine as in claim 8, wherein said positioning means includes an elongated member adapted for passage through the digestive tract of a fish.

* * * * *